US012626459B2

(12) United States Patent
Roimela et al.

(10) Patent No.: US 12,626,459 B2
(45) Date of Patent: May 12, 2026

(54) METHOD AND SYSTEM FOR ENABLING EXPOSURE-GUIDED THREE-DIMENSIONAL RECONSTRUCTION

(71) Applicant: Varjo Technologies Oy, Helsinki (FI)

(72) Inventors: Kimmo Roimela, Tampere (FI); Anton Brandl, Munich (DE)

(73) Assignee: Varjo Technologies Oy, Helsinki (FI)

( * ) Notice: Subject to any disclaimer, the term of this patent is extended or adjusted under 35 U.S.C. 154(b) by 190 days.

(21) Appl. No.: 18/754,831

(22) Filed: Jun. 26, 2024

(65) Prior Publication Data

US 2026/0004513 A1     Jan. 1, 2026

(51) Int. Cl.
 G06T 17/00     (2006.01)
 G06T 5/92     (2024.01)
 G06V 10/75     (2022.01)

(52) U.S. Cl.
 CPC ................ G06T 17/00 (2013.01); G06T 5/92 (2024.01); G06V 10/751 (2022.01); G06T 2207/20081 (2013.01); G06T 2207/20084 (2013.01); G06T 2207/20208 (2013.01)

(58) Field of Classification Search
 None
 See application file for complete search history.

(56) References Cited

U.S. PATENT DOCUMENTS

2024/0354914 A1*   10/2024   Choudhury ............... G06T 5/90
2025/0095125 A1*    3/2025   Wanat .................... G06V 10/60

OTHER PUBLICATIONS

Marnerides et al., "ExpandNet: A Deep Convolutional Neural Network for High Dynamic Range Expansion from Low Dynamic Range Content," May 22, 2018, Wiley, 37-49 (Year: 2018).*

* cited by examiner

*Primary Examiner* — Robert J Craddock
(74) *Attorney, Agent, or Firm* — Ziegler IP Law Group, LLC.

(57)     ABSTRACT

Disclosed is a method for enabling exposure-guided three-dimensional (3D) reconstruction, including (i) receiving Low Dynamic Range (LDR) input image captured by camera; (ii) rendering High Dynamic Range (HDR) image corresponding to input image, using HDR 3D reconstruction model pre-trained for HDR image reconstruction of 3D environment; (iii) applying HDR to LDR tone-mapping operator on HDR image, for producing tone-mapped LDR image; (iv) determining first loss function (FLF) between input image and tone-mapped LDR image, FLF comprising weighted pixel value differences between pixels of input image and corresponding pixels of tone-mapped LDR image; (v) determining whether input image has saturated pixel(s), saturated pixel(s) comprises: highlight saturated pixel, shadow saturated pixel; (vi) de-weighting pixel value difference corresponding to saturated pixel in FLF; (vii) back-propagating gradient of FLF with respect to model parameters, through differentiable render function of HDR 3D reconstruction model, for adjusting model parameters in way that reduces FLF.

15 Claims, 1 Drawing Sheet

METHOD AND SYSTEM FOR ENABLING EXPOSURE-GUIDED THREE-DIMENSIONAL RECONSTRUCTION

TECHNICAL FIELD

The present disclosure relates to methods for enabling exposure-guided three-dimensional (3D) reconstruction. Moreover, the present disclosure relates to systems for enabling exposure-guided 3D reconstruction.

BACKGROUND

In recent times, advancements in three-dimensional (3D) reconstruction techniques have revolutionized recreation (i.e., reconstruction) of detailed digital 3D models of 3D environments, from images captured using common devices like smartphones and cameras. For example, 3D reconstruction techniques such as Neural Radiance Fields (NeRF) and Gaussian Splatting have showcased impressive capabilities in accurately reconstructing 3D real-world scenes from said images.

However, a significant challenge arises when existing 3D reconstruction techniques are employed to reconstruct 3D scenes with high dynamic range (HDR) illumination, using said images. Notably, the aforesaid common devices can only capture low dynamic range (LDR) slices of the (true) HDR illumination of the 3D scenes in said images. As an example, parts of said images may be over-exposed (too bright) or under-exposed (too dark). Thus, the vast illumination range of the 3D scenes is inaccurately captured in the LDR images, and resultantly inaccurately reconstructed in the 3D models. For example, said common devices may capture two images depicting a same scene but captured with different exposure levels. One image amongst the two images may show a window as overexposed (appearing as a solid white colour with no visible details of an outside scene), while the other image shows the outside scene properly exposed (thus revealing detailed information beyond the window). This difference in exposure levels between the two images and its corresponding effect on visual detail leads to ambiguities and errors in reconstructing the scene outside the window using existing 3D reconstruction techniques. Since half of evidence suggests that the window and its outside scene should be the solid white colour, while another half shows it with actual details, the 3D reconstruction techniques do not have a single solution to aim for. This usually results in artifacts such as floating clouds of matter (i.e., floaters) in thin air as an optimization algorithm (which is a 3D reconstruction algorithm) attempts to recreate a 3D model that can explain the two images (leading to overfitting).

Existing methods attempt to address the aforesaid challenge of reconstructing 3D scenes with HDR illumination through various approaches. For example, inverse tone mapping is traditionally applied to bracketed stacks of LDR images to recover HDR data and camera tone curve. As another example, in recent times neural network models have been used to recover HDR information from single LDR images. However, both these methods are unable to recover accurate and sufficient HDR data from the LDR images. In yet another example, approaches based on exposure compensation during 3D reconstruction utilize per-pixel scaling as part of its training loop to unify exposure levels across input images, but still struggle to mitigate saturation from the input images effectively. In still another example, the 3D reconstruction techniques that focus on view-dependent color reconstruction in standard red-green-blue (SRGB) space, are being employed. In 3D Gaussian Splatting, this is implemented using a representation of said color space using spherical harmonics, but it often results in noticeable reconstruction artifacts and inaccuracies, especially in complex scenes with diverse lighting conditions.

Therefore, in light of the foregoing discussion, there exists a need to overcome the aforementioned drawbacks.

SUMMARY

The aim of the present disclosure is to provide a method and a system for enabling exposure-guided three-dimensional (3D) reconstruction, for reconstructing accurate HDR 3D models of 3D environments using LDR images. The aim of the present disclosure is achieved by a method for enabling exposure-guided 3D reconstruction and a system for enabling exposure-guided 3D reconstruction as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
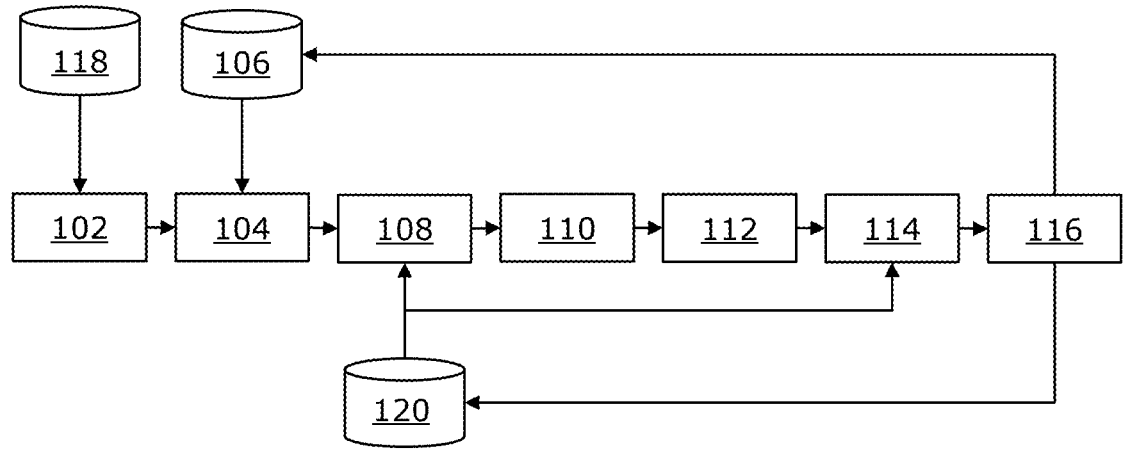
FIG. 1 illustrates a process flow of a method for enabling exposure-guided three-dimensional (3D) reconstruction, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for enabling exposure-guided three-dimensional (3D) reconstruction, the method comprising:

(i) receiving an input image captured by a camera, wherein the input image is a Low Dynamic Range (LDR) image;

(ii) rendering a High Dynamic Range (HDR) image corresponding to the input image, using a HDR 3D reconstruction model that is pre-trained for HDR image reconstruction of a 3D environment;

(iii) applying a HDR to LDR tone-mapping operator on the HDR image, for producing a tone-mapped LDR image;

(iv) determining a first loss function between the input image and the tone-mapped LDR image, the first loss function comprising weighted pixel value differences between pixels of the input image and their corresponding pixels of the tone-mapped LDR image;

(v) determining whether the input image has at least one saturated pixel, wherein the at least one saturated pixel comprises at least one of: a highlight saturated pixel, a shadow saturated pixel;

(vi) de-weighting at least one pixel value difference corresponding to the at least one saturated pixel, in the first loss function, when it is determined that the input image has the at least one saturated pixel; and (vii) back-propagating a gradient of the first loss function with respect to one or more model parameters, through a differentiable render function of the HDR 3D reconstruction model, for adjusting the one or more model parameters in a way that reduces the first loss function, wherein the differentiable render function comprises an HDR image-rendering function and the HDR to LDR tone-mapping operator.

In a second aspect, the present disclosure provides a system for enabling exposure-guided three-dimensional (3D) reconstruction, the system comprising at least one processor configured to:

(i) receive an input image captured by a camera, wherein the input image is a Low Dynamic Range (LDR) image, and wherein the at least one processor is communicably coupled to the camera or to a data repository that is communicably coupled to the camera;

(ii) render a High Dynamic Range (HDR) image corresponding to the input image, using a HDR 3D reconstruction model that is pre-trained for HDR image reconstruction of a 3D environment;

(iii) apply a HDR to LDR tone-mapping operator on the HDR image, to produce a tone-mapped LDR image;

(iv) determine a first loss function between the input image and the tone-mapped LDR image, the first loss function comprising weighted pixel value differences between pixels of the input image and their corresponding pixels of the tone-mapped LDR image;

(v) determine whether the input image has at least one saturated pixel, wherein the at least one saturated pixel comprises at least one of: a highlight saturated pixel, a shadow saturated pixel;

(vi) de-weight at least one pixel value difference corresponding to the at least one saturated pixel, in the first loss function, when it is determined that the input image has the at least one saturated pixel; and (vii) back-propagate a gradient of the first loss function with respect to one or more model parameters, through a differentiable render function of the HDR 3D reconstruction model, for adjusting the one or more model parameters in a way that reduces the first loss function, wherein the differentiable render function comprises an HDR image-rendering function and the HDR to LDR tone-mapping operator.

The present disclosure provides the aforementioned method and the aforementioned system which provide a simple and effective solution for enhancing an accuracy and a quality of HDR 3D reconstruction of 3D environments, by implementing exposure-guided 3D reconstruction. The method effectively mitigates adverse effects of overexposed and underexposed regions of input images in the training of the HDR 3D reconstruction model, by de-weighting pixel value differences corresponding to saturated pixel(s) of the input image, in the first loss function. Then, back-propagating the first loss function which incorporates exposure-compensation (due to de-weighting) ensures prevention of exposure-based artifacts in the HDR 3D reconstruction model and overfitting of the HDR 3D reconstruction model. This ensures a more accurate 3D reconstruction of original scene using LDR images, as compared to existing solutions. During such back-propagation, there is refinement and adaptation of the one or more model parameters of the HDR 3D reconstruction model according to the first loss function incorporating exposure compensation, resulting in an advanced quality of final 3D representation in the HDR 3D reconstruction model. The synergistic effect of the step (vi) and of the step (vii) is the provision of the exposure compensation in the first loss function for reducing impact of saturated pixel(s) on the adjustment of the one or more model parameters, resulting in improvement the HDR 3D reconstruction model even when exposure issues are present in input images. It will be appreciated that while the method describes exposure compensation during HDR reconstruction training, using a single input LDR image, the method could be used for implementing exposure compensation for multiple input LDR images. The system comprising the at least one processor easily implements these steps of the method without computational overload. This integration of exposure compensation in the method and system not only improves visual fidelity and realism of reconstructed 3D environments but also provides an efficient 3D reconstruction process, that is adaptable to a wide range of real-world applications.

Throughout the present disclosure, the phrase "exposure-guided 3D reconstruction" refers to a technique wherein 3D reconstruction of the 3D environment is performed using exposure-related information. The exposure-related information is used to implement exposure compensation during training of the HDR 3D reconstruction model for 3D reconstruction, which beneficially allows for generating accurate, coherent, artifact-free images of any 3D scene within the 3D environment when the HDR 3D reconstruction model of the 3D environment is used upon training.

The term "input image" refers to an image which is to be used for the 3D reconstruction (i.e., for building and/or further training the HDR 3D reconstruction model). Notably, the input image is captured by the camera, wherein the camera is, for example, a Red-Green-Blue (RGB) camera, a RGD-Depth (RGB-D) camera, a grayscale camera, or similar. The camera could be a standalone camera, or may be arranged in a device such as a smartphone, a teleport device, a head-mounted device, a tablet computer, and the like. The input image being the LDR image means that the input image has a limited range (i.e., a narrow range) of brightness and colour depth. In other words, parts of the input image may be over-exposed or under-exposed, depending on brightness levels in the limited LDR range.

At step (i) of the method, the input image is received from the camera, or from a data repository at which a plurality of images captured by the camera are stored, or similar. The data repository may be a local memory of the camera, a removable memory, a cloud-based memory, or similar. Optionally, the input image is selected from amongst the plurality of input images which represent the 3D environment from a plurality of viewpoints and view directions, wherein the camera is used to capture the plurality of input images. Optionally, in this regard, the selection of the input image is a random selection. It will be appreciated that since the input image is selected from amongst the plurality of input images, a viewpoint and a view direction of the input image is known.

The HDR 3D reconstruction model is a digital representation of the 3D environment in HDR. Prior to use, the HDR 3D reconstruction model is trained using the plurality of input images, for reconstructing the 3D environment such that said model accurately captures appearances, arrangements, geometries, textures, and the like, of objects in the 3D environment. The 3D environment is reconstructed in HDR, which means that the HDR 3D reconstruction model represents the 3D environment using a large range (i.e., a wide range) of brightness and colour depth.

At step (ii) of the method, the HDR 3D reconstruction model is used to render the HDR image corresponding to the input image. Such rendering is performed by providing the viewpoint and the view direction of the input image to the HDR 3D reconstruction model, and employing a 3D reconstruction technique for rendering the HDR image based on the viewpoint and the view direction. In this way, the HDR image closely matches a 3D scene represented in the input image. The HDR image is rendered corresponding to the input image, for ease of comparison therebetween, which resultantly enables exposure compensation in 3D reconstruction.

Optionally, the HDR 3D reconstruction model is one of: a neural network, a voxel grid, a point cloud. These different approaches offer different advantages in terms of HDR 3D reconstruction, and any of them can be used in the present method. A technical effect of the HDR 3D reconstruction model being one of: the neural network, the voxel grid, the point cloud, is that is provides adaptability and precision in HDR 3D scene reconstruction. This flexibility enables the HDR 3D reconstruction to be adjusted to specific characteristics of input data (which is the plurality of input images) and desired output quality, ensuring optimal results across various applications and environments.

In the above regard, the neural network is a machine learning model. It will be appreciated that that using the neural network as the HDR 3D reconstruction model, especially when implemented with a 3D reconstruction and scene rendering technique such as Neural Radiance Fields (NeRF), enables in capturing complex details and fine textures of the 3D scene. NeRF directly leans a continuous representation of the 3D scene's geometry and appearance from the plurality of input images (which as two-dimensional (2D) images). This results in producing a highly accurate and realistic HDR 3D reconstruction model. This is particularly advantageous for applications requiring high fidelity and precision.

Furthermore, the voxel grid is a 3D grid of voxels, where each voxel contains HDR information about a volume of the 3D scene. The point cloud represents the 3D scene with a collection of points in a 3D space, each point containing HDR information. Optionally, a Gaussian Splatting technique is used for 3D reconstruction in the form of the voxel grid or the point cloud. The Gaussian Splatting technique uses Gaussian functions to smooth representation of points in the voxel grid or the point cloud, improving visual quality and continuity in the HDR 3D reconstruction model.

Applying the HDR to LDR tone-mapping operator on the HDR image at step (iii) of the method means that a tone-mapping technique is applied on the HDR image. Upon implementation of the tone-mapping technique, a first dynamic range of the HDR image is mapped to a second dynamic range of the input image, the second dynamic range being smaller than the first dynamic range. The tone-mapping operator applies a non-linear transformation to the HDR image, compressing its dynamic range while preserving as much detail and contrast as possible. The tone-mapping operator defines how the (wide) first dynamic range of the HDR image is to be compressed into the (limited) dynamic range, and involves non-linear transformations for preserving details, contrast, and overall visual quality, to the extent possible. It will be appreciated that the tone-mapped LDR image is simply a version of the HDR image which has a smaller dynamic range than the HDR image. The compression of the dynamic range of the HDR image from HDR to LDR is performed so that a comparison between the input image (which is the LDR image) and the HDR image can be accurately performed. The input image and the tone-mapped LDR image are both LDR images, and thus they can be compared with respect to each other.

Throughout the present disclosure, the term "loss function" refers to a function indicative of a difference between two compared entities, with respect to one or more attributes. The first loss function is indicative of pixel value differences between the input image and the tone-mapped LDR image, wherein the pixel value differences are weighted. Such weighting indicates an impact of corresponding pixel value differences, on the difference between the input image and the tone-mapped LDR image. In a practical implementation, a smooth weighting function may be employed for assigning weights in the first loss function, for example, starting from a weight equal to 1 for small pixel value differences, to a weight equal to or close to zero, for large pixel value differences. In the first loss function that is determined at step (iv) of the method, "pixel value differences" is an attribute being compared between the input image and the tone-mapped LDR image. Throughout the present disclosure, the term "pixel value" refers to a value (i.e., an intensity) of one or more colour components (in a colour space) for a pixel. In other words, said pixel value is indicative of a brightness and a colour of the pixel. Therefore, a pixel value difference between a given pixel of the input image and a corresponding pixel of the tone-mapped LDR image indicates how well (i.e., how accurately) the HDR 3D reconstruction model reconstructs the HDR image, given the input image. Lesser the pixel value difference between the given pixel of the input image and the corresponding pixel of the tone-mapped LDR image, greater is an accuracy of the HDR 3D reconstruction model reconstructs the HDR image based on the input image. As an example, the first loss function may be expressed by the following equation:

$$LF1 = f(wi * PVDi), \text{ where } i = 1, 2, 3, \dots, N$$

where, LF1 is the first loss function, PVDi is the pixel value difference of an ith pixel, wi is the weight of the pixel value difference of the ith pixel, and N is a total number of pixels in the input image/the tone-mapped HDR image.

Optionally, weights in the first loss function lie in a range of 0-1. For example, the weights may be from 0.05, 0.1, 0.15, 0.2, 0.3, 0.5, or 0.7, up to 0.25, 0.4, 0.55, 0.75, 0.85, 0.9, 0.95, or 1. It will be appreciated that intermediate values of the weights are also feasible. Alternatively, optionally, the weights in the first loss function may lie in other ranges too, for example a range of 0-10, 0-50, 0-100, or similar.

Next, at step (v) of the method, the input image is analysed to determine whether it has any saturated pixel. A pixel is determined to be a "saturated pixel" if its pixel value is: A) greater than a first threshold LDR pixel value corresponding to a maximum LDR pixel value, or B) lesser than a second threshold LDR pixel value corresponding to a minimum LDR pixel value. When condition A) is true, the pixel is a highlight saturated pixel, whereas when condition B) is true, the pixel is a shadow saturated pixel. The term "highlight saturated pixel" refers to an over-exposed pixel (i.e., a pixel which is too bright). In this regard, the input image may optionally have at least one highlight saturation region comprising at least one highlight saturated pixel. The term "shadow saturated pixel" refers to an under-exposed pixel (i.e., a pixel which is too dark). In this regard, the input image may optionally have at least one saturation region comprising at least one shadow saturated pixel. Notably, saturated pixels do not accurately represent all visual details of their corresponding 3D spaces, so when pixel values of such saturated pixels of the input image are compared with pixel values of corresponding pixels at the step (iv) of the method, pixel value differences in the determined first loss function which correspond to such saturated pixels, would have large values and be inaccurate. It will be appreciated that performing the determination of whether the input image has the at least one saturated pixel enables in rectifying this inaccuracy in the first loss function for reducing the first loss function, to further enable improving an accuracy of the HDR 3D reconstruction model.

At step (vi) of the method, the at least one pixel value difference corresponding to the at least one saturated pixel (that is determined to be present in the input image) is de-weighted, for correcting the first loss function. Herein, "de-weighting" a given pixel value difference corresponding to a saturated pixel means that a weight of the given pixel value difference is reduced (to a lesser weight, or to zero). Notably, an output of the first loss function for the at least one saturated pixel is de-weighted by scaling down (i.e., reducing) a weight of the at least one pixel value difference. By such de-weighting, a loss value of the at least one saturated pixel is reduced, wherein the loss value is equal to a product of a weight and a pixel value difference corresponding to the at least one saturated pixel. A technical effect of the aforesaid de-weighting operation is that it reduces or completely mitigates an adverse impact of the at least one saturated pixel on the one or more model parameters of the HDR 3D reconstruction model. For example, when a pixel value difference corresponding to a saturated pixel is de-weighted to zero, said saturated pixel is excluded from impacting the one or more model parameters as its loss value in the first loss function becomes zero. Various manners of performing the step of de-weighting are described later in more detail.

Next, at the step (vii) of the method, the one or more model parameters of the HDR 3D reconstruction model are adjusted, for beneficially reducing the first loss function. The reduction of the first loss function means that the accuracy of the HDR 3D reconstruction model is improved. In other words, the HDR 3D reconstruction model is optimized, by adjustment of the one or more model parameters, according to the first loss function. Upon such optimization, the HDR 3D reconstruction model is able to render realistic, accurate and coherent HDR images, even when the HDR 3D reconstruction model is trained using LDR input images having over-exposed and/or under-exposed regions.

The differential render function is that part of the HDR 3D reconstruction model which renders images. In this regard, the HDR image-rendering function of the differential render function is used to render HDR images (such as, at the step (ii) of the method), and the HDR to LDR tone-mapping operator of the differential render function is used to produce tone-mapped LDR images from the HDR images (such as, at the step (iii) of the method). Notably, the differential render function is differentiable (i.e., it is smooth and continuous) so that the gradient of the first loss function can be computed and propagated back into the HDR 3D reconstruction model through said function. The gradient of the first loss function is indicative of how to adjust the one or more model parameters, to reduce an error of the HDR 3D reconstruction model, wherein said error is given by the first loss function. By the aforesaid back-propagation, the gradient is used to update the one or more model parameters.

Throughout the present disclosure, the term "model parameter" refers to a parameter of the HDR 3D reconstruction model that is trainable (i.e., adjustable) to achieve a high accuracy of the HDR 3D reconstruction model. The one or more model parameters may be expressed as directly trainable parameters, or may be mapped to a neural network via an embedding of abstract neural network parameters to 3D coordinates, or similar. Examples of the one or more model parameters include, but are not limited to, colours, opacities, 3D positions, orientations, scales, spherical harmonic coefficients, or normal vectors of individual elements of the model. Furthermore, the one or more model parameters could include any scene-independent, scene-specific, camera-specific, or frame-specific parameters, such as exposure value, tone mapping operator parameters, rendering parameters, camera pose, camera rotation, camera intrinsics, or similar.

Optionally, the steps (ii)-(vii) are performed iteratively until the first loss function is minimized. Optionally, in this regard, a number of iterations is greater than two. For example, the number of iterations may be 2, 3, 4, 5, 6, 7, 8, 9, 10, and so on. It will be appreciated that the number of iterations depends on how the first loss function changes with adjustment of the one or more model parameters at each iteration. The iterative performance of the steps (ii)-(vii) may be terminated when the first loss function attains a minimum feasible value, or when the first loss function attains a target value, or when the first loss function would increase if a next iteration of the steps (ii)-(vii) is performed, or similar. Notably, at each iteration, the one or more model parameters are adjusted in a way that reduces the first loss function, leading to an incremental improvement in the accuracy of the HDR 3D reconstruction model. Upon termination of the iterations, the accuracy of the HDR 3D reconstruction model is significantly improved in terms of addressing errors and artifacts caused due to over-exposure or under-exposure in the input image.

In an embodiment, the step (vi) of de-weighting the at least one pixel value difference comprises:
  determining a derivative of the HDR to LDR tone-mapping operator, for each pixel of the input image; and
  adjusting a weight of the at least one pixel value difference such that the weight is proportional to the derivative of the HDR to LDR tone-mapping operator, the weight lying within a first threshold from zero.

In this regard, the derivative of the HDR to LDR tone-mapping operator, for a given pixel quantifies how rapidly a given pixel value for the given pixel changes during the tone-mapping process implemented at the step (iii). It provides valuable information about sensitivity and behaviour of the HDR to LDR tone-mapping operator.

The term "weight" refers to a scalar value assigned to the at least one pixel value difference in the first loss function. This weight determines an importance and/or a contribution of the at least one pixel value difference in the first loss function, when the first loss function is used for optimizing the HDR 3D reconstruction model at the step (vii). A higher weight indicates that the corresponding pixel value difference has a stronger impact on the first loss function, while lower weight indicates lesser influence on the first loss function.

The "first threshold" defines a range from zero within which the (adjusted) weight of the at least one pixel value difference during the de-weighting should lie. Specifically, the first threshold is used to constrain the range of adjusted weights to ensure that they are equal to zero or close to zero, so that the loss function is updated for effective over-exposure and/or under-exposure compensation. When the weight is adjusted to lie within the first threshold from zero, the weight becomes significantly small and, then the impact of the at least one saturated pixel on the first loss function is lowered. Optionally, the first threshold lies in a range of 0 to 0.5. For example, the first threshold lies in a range from 0, 0.05, 0.1, 0.15, 0.2, 0.3, or 0.4, up to 0.25, 0.1, 0.25, 0.45, or 0.5. This range ensures that when de-weighting, the weights corresponding to saturated pixels are adjusted to fall within the range of 0 to 0.5. Weights above 0.5 would indicate high impact on the first loss function, which is not desirable for the at least one saturated pixel. Maintaining the weight of the at least one pixel value difference within the first threshold achieves a fine balance between preserving important image details and mitigating the influence of potentially misleading pixel value differences (due to over-exposure or under-exposure).

Hereinabove, optionally, adjusting the weight to be pro-portional to the derivative of the HDR to LDR tone-mapping operator means that fine-grained adjustments in weight assignment are based on how the tone-mapping process behaves at different pixel locations within the input image. Pixels with higher derivative values indicate regions where tone-mapping has a more significant impact (i.e., more significant change in pixel values causing a higher pixel value difference), allowing for more drastic weight adjust-ment in response to this significant impact, and vice versa. Beneficially, applying the weight to the first loss function proportional to the derivative of the HDR to LDR tone-mapping operator ensures that flatter regions of a tone-mapping curve at high and low exposure regions of the input image receive the weight approaching to zero. This mini-mizes the influence of these regions on the first loss function, thereby preventing overfitting during training of the HDR 3D reconstruction model and ensuring a more accurate HDR 3D reconstruction. Beneficially, said adjustment of the weight of the at least one pixel value difference enables a localized and adaptive approach to reduce an impact of the at least one pixel value difference on the first loss function. This adaptive weighting strategy enhances the ability of the HDR 3D reconstruction model to prioritize important image details, leading to more accurate and nuanced 3D recon-structions.

In another embodiment, the step (vi) of de-weighting the at least one pixel value difference comprises adjusting a weight of the at least one pixel value difference according to a value of at least one of: a first ramp function, a second ramp function, for the at least one saturated pixel, wherein the first ramp function ranges between 0 to 1 such that the value of the first ramp function is equal to 0 when a pixel value of a saturated pixel is equal to a maximum LDR pixel value, and the value of the first ramp function is equal to 1 when the pixel value of the saturated pixel is equal to a first threshold LDR pixel value corresponding to the maximum LDR pixel value, and the second ramp function ranges between 0 to 1 such that the value of the second ramp function is equal to 0 when a pixel value of a saturated pixel is equal to a minimum LDR pixel value, and the value of the second ramp function is equal to 1 when the pixel value of the saturated pixel is equal to a second threshold LDR pixel value corresponding to the minimum LDR pixel value.

The difference between threshold LDR pixel values and corresponding maximum LDR pixel value and minimum LDR pixel value (for over-saturation and under-saturation, respectively) may be different, and thus de-weighting of corresponding saturated pixels could be performed using different ramp functions. Herein, the purpose of the first ramp function is to smoothly transition (i.e., reduce) the weight of pixel value differences corresponding to saturated pixels from 1 to 0, as pixel values of the saturated pixels in the input image increase from the first threshold LDR pixel value up to the maximum LDR pixel value. In this regard, the saturated pixels are highlight saturated pixels as they have very high LDR pixel values. The first threshold LDR pixel value is a pixel value beyond which any pixel starts to become overexposed. (i.e., exhibits signs of over-saturation or over-exposure). Similarly, the purpose of the second ramp function is to smoothly transition (i.e., reduce) the weight of pixel value differences corresponding to saturated pixels from 1 to 0, as pixel values of the saturated pixels in the input image decrease from the second threshold LDR pixel value down to the minimum LDR pixel value. In this regard, the saturated pixels are shadow saturated pixels as they have very low LDR pixel values. The second threshold LDR pixel value is a pixel value below which any pixel starts to become underexposed (i.e., exhibits signs of under-saturation or under-exposure). For example, the first ramp function and the second ramp function may range from 0, 0.05, 0.1, 0.15, 0.2, 0.3, 0.5, or 0.7, up to 0.25, 0.4, 0.55, 0.75, 0.85, 0.9, 0.95, or 1. Alternatively, optionally, the first ramp function and the second ramp function may lie in other ranges too, for example a range of 0-10, 0-50, 0-100, or similar. In one embodiment, slopes of the first ramp function and the second ramp function are the same. In another embodiment, slopes of the first ramp function and the second ramp function are different.

Optionally, the phrase "adjusting the weight of the at least one pixel value difference according to the value of the at least one of: the first ramp function, the second ramp function" could mean any of the following: the weight is adjusted to be equal to the value of the at least one of: the first ramp function, the second ramp function;

the weight is adjusted by multiplying the weight by the value of the at least one of: the first ramp function, the second ramp function.

Herein, the first ramp function is designed to smoothly de-weight the at least one pixel value difference from 1 to 0, based on the pixel value of the saturated pixel in the input image, for specifically addressing over-saturation scenarios. In an example, the maximum LDR pixel value in the input image may be 255 (for an 8-bit input image having RGB pixel values). Suppose a saturated pixel in the input image has a pixel value of 255, which is the maximum LDR pixel value, and a current weight of a pixel value difference corresponding to said saturated pixel may be 0.6.

Then the first ramp function may be used to adjust the current weight from 0.6 to 0 (i.e., to de-weight said pixel value difference). This means that said pixel value difference would not have any impact on the value of the first loss function. Now let us suppose that the first threshold LDR pixel value is 230. Another saturated pixel in the input image may have a pixel value of 230. In this case, the value of the first ramp function is equal to 1, which can mean that a current weight of said saturated pixel may remain unchanged, or may be adjusted to be equal to 1, or similar. Now let us consider yet another saturated pixel having a pixel value of 240 (which is between the first threshold LDR pixel value of 230 and the maximum LDR pixel value of 255), and a current weight of a pixel value difference corresponding to said saturated pixel may be 0.55. In this case, the value of the first ramp function might be 0.4, which can mean that the current weight of said saturated pixel may be adjusted to be equal to the value of the first ramp function (i.e., equal to 0.4), or may be adjusted by a factor of the value of the first ramp function (i.e., equal to 0.22, which is given by 0.55*0.4), or similar. It will be appreciated that the second ramp function is designed to smoothly de-weight the at least one pixel value difference from 1 to 0, based on the pixel value of the saturated pixel in the input image, for specifically addressing under-saturation scenarios, in a similar manner as described above with respect to the first ramp function.

Beneficially, using the at least one of: the first ramp function, the second ramp function, for adjusting the at least one pixel value difference of the at least one saturated pixel modifies the first loss function dynamically according to a saturation extent of the at least one saturated pixel. This adaptive adjustment optimizes the first loss function such that an impact of both under-exposed and over-exposed pixels on the value of the first loss function is reduced linearly according to the saturation extent of such pixels.

In yet another embodiment, the step (vi) of de-weighting the at least one pixel value difference comprises:

adjusting a weight of a pixel value difference to zero, when a pixel value of a corresponding saturated pixel is equal to a maximum LDR pixel value or to a minimum LDR pixel value; and adjusting a weight of a pixel value difference to one, when a pixel value of a corresponding saturated pixel is equal to any other pixel value.

In this regard, when the pixel value of the corresponding saturated pixel is equal to the maximum LDR pixel value (i.e., a brightest pixel value such as white, for example) or to the minimum LDR pixel value (i.e., a darkest pixel value such as black, for example), the corresponding saturated pixel does not provide correct colour and visual detail of a corresponding region in the 3D scene. Therefore, adjusting the weight of the pixel value difference to zero excludes these unreliable saturated pixel(s) from negatively impacting the first loss function. This ensures that the loss function is optimized to include only losses of those saturated pixels which have non-extreme pixel values, along with losses of unsaturated pixels, since these two types of pixels better represent the true colour and visual detail of the 3D scene in the input image. Such an optimized first loss function improves an accuracy of subsequent adjustment of the one or more model parameters.

Furthermore, when pixel value of the corresponding saturated pixel is equal to the any other pixel value, the corresponding saturated pixel provides at least some colour and visual detail of a corresponding region in the 3D scene (that is represented in the input image). Such colour and visual detail may be useful for a realistic and detailed HDR 3D reconstruction of the 3D scene. Hence, treating all saturated pixels having such non-extreme pixel values equally and setting their weight to 1, ensures that these details are accurately captured in the first loss function, by way of pixel value differences of such pixels. In this way, the first loss function is optimized to further improve the accuracy of subsequent adjustment of the one or more model parameters.

Such a de-weighting scheme is a binary de-weighting scheme and is thus easy to implement.

In still another embodiment, the step (vi) of de-weighting the at least one pixel value difference comprises:

adjusting a weight of a pixel value difference corresponding to a pixel of the tone-mapped LDR image whose pixel value is greater than a first threshold LDR pixel value corresponding to a maximum LDR pixel value, to zero; and adjusting a weight of a pixel value difference corresponding to a pixel of the tone-mapped LDR image whose pixel value is lesser than a second threshold LDR pixel value corresponding to a minimum LDR pixel value, to zero, wherein the first threshold LDR pixel value and the second threshold LDR pixel value are defined by values of one or more parameters of the HDR to LDR tone-mapping operator.

In this regard, the "one or more parameters" refer to those parameters of the HDR to LDR tone-mapping operator that influence how HDR pixel values are converted to LDR pixel values upon applying the HDR to LDR tone-mapping operator on any HDR image. These parameters are essential in defining the first threshold LDR pixel value and the second threshold LDR pixel value used for the aforesaid de-weighting. Examples of the one or more parameters may include, but are not limited to, an exposure value (EV), a gamma correction, a knee point, a saturation level, a white point, and a black point.

Notably, this method of de-weighting is asymmetric, meaning that the adjustment of the weight of the pixel value difference depends on whether a rendered and tone-mapped pixel is brighter or darker than respective thresholds defined by the one or more parameters of the HDR to LDR tone-mapping operator. In this de-weighting approach, a pixel value of each pixel in the tone-mapped LDR image is compared to the first threshold LDR pixel value and the second threshold LDR pixel value. When the pixel value is greater than the first threshold LDR pixel value, it indicates over-exposure of the pixel (i.e., indicates that the pixel is a highlight saturation pixel) and thus the weight of the corresponding pixel value difference is then set to zero. This adjustment means that these high-pixel value pixels do not contribute to the first loss function, which is used during the optimization process, hence effectively excluding highlight saturation pixels from influencing the HDR 3D reconstruction. In an example, the first threshold LDR pixel value may be 240, and a pixel value of a pixel in the tone-mapped LDR image might be 255. In this regard, the tone-mapped pixel value (which is 255) is greater than the first threshold LDR pixel value, so the weight of the pixel value difference for this over-exposed pixel is set to zero, for nullifying loss contribution of this over-exposed pixel in the first loss function.

Similarly, when the pixel value is lesser than the second threshold LDR pixel value, it indicates under-exposure of the pixel (i.e., indicates that the pixel is a shadow saturation pixel) and thus the weight of the corresponding pixel value difference is then set to zero. This adjustment means that these low pixel-value pixels do not contribute to the first loss function, which is used during the optimization process, hence effectively excluding shadow saturation pixels from influencing the HDR 3D reconstruction. In another example, the second threshold LDR pixel value may be 15, and a pixel value of a pixel in the tone-mapped LDR image might be 10. In this regard, the tone-mapped pixel value (which is 10) is lesser than the second threshold LDR pixel value, so the weight of the pixel value difference for this under-exposed pixel is set to zero, for nullifying loss contribution of this under-exposed pixel in the first loss function.

A technical effect of adjusting the weight of the pixel value differences in the aforesaid manner is that pixel value differences of over-exposed pixels and under-exposed pixels do not contribute to the first loss function, and thus do not impact the adjustment of the one or more model parameters of the HDR 3D reconstruction model. Its further benefit is the reduction of artifacts caused by the overexposed and the underexposed regions of the tone-mapped LDR image, in the HDR 3D reconstruction model. This selective exclusion of unreliable pixel information enhances the accuracy and reliability of the HDR 3D reconstruction.

Optionally, the method further comprises estimating a camera tone reproduction curve by:

initializing a value of at least one trainable parameter of the HDR to LDR tone-mapping operator to a default value;

generating a training dataset comprising ground truth LDR images captured by the camera and HDR images corresponding to the ground truth LDR images; and performing at least one iteration of:

applying the HDR to LDR tone-mapping operator on the HDR images, for producing tone-mapped LDR images;

determining a second loss function between the ground truth LDR images and the tone-mapped LDR images, the second loss function comprising weighted pixel value differences between pixels of the ground truth LDR images and their corresponding pixels of the tone-mapped LDR image; and back-propagating the second loss function through the HDR to LDR tone-mapping operator for adjusting the value of the at least one trainable parameter in a way that reduces the second loss function, wherein when the second loss function is minimized upon performing the at least one iteration, the HDR to LDR tone-mapping operator best approximates the camera tone reproduction curve, and wherein the HDR to LDR tone-mapping operator that best approximates the camera tone reproduction curve is used at step (iii) and/or step (vi).

In this regard, the term "camera tone reproduction curve" refers to a mathematical model that describes how the camera captures and reproduces tones and colours of the 3D scene in any input image. The camera tone reproduction curve (camera TRC) specifically denotes a relationship between luminance or intensity values of the 3D scene and the corresponding pixel values recorded by an image sensor of the camera. In other words, the camera TRC helps to compress the wide dynamic range of real-world 3D scenes into the limited dynamic range of the camera's image sensor.

Optionally, the at least one trainable parameter of the HDR to LDR tone-mapping operator comprises at least one of: an exposure adjustment parameter, a gamma correction parameter, a local contrast enhancement parameter, a logarithmic base, an average luminance level, a bias parameter. The initialization of the value of the at least one trainable parameter to the default value as establishes a starting point for the estimation of the camera TRC. Optionally, the HDR to LDR tone-mapping operator is a sigmoid function. As an example, the sigmoid function may be equal to $(x\hat{\ }b)/[\{(1/a)\hat{\ }b\}+ (x\hat{\ }b)]$, where 'x' is an input pixel value, 'a' and 'b' are trainable parameters that control a shape of sigmoid curve. In this regard, the sigmoid function maps the HDR pixel values to the LDR values smoothly, ensuring that high dynamic range values are compressed into a lower dynamic range values without abrupt transitions, thereby preserving the overall visual quality. Beneficially, by adjusting the parameters 'a' and 'b', the sigmoid function can be tuned to achieve the desired level of detail and contrast in the LDR image. The sigmoid function ensures that the output values are bounded between 0 and 1, which is suitable for typical LDR image representations.

Herein, the "training dataset" refers to a collection of data used to train the HDR to LDR tone-mapping operator. The ground truth LDR images in the training dataset are optionally captured under different lighting conditions and/or environmental conditions and exposure levels. The corresponding HDR images of the ground truth LDR images may be generated using exposure bracketing technique or other HDR imaging technique to combine multiple ground truth LDR images having multiple exposure levels into a single HDR image. Beneficially, the training dataset is generated to include such images so that when used for training, the training dataset improves a tone-mapping ability of the HDR to LDR tone-mapping operator.

After the training dataset is generated, the step of estimating the camera TRC involves iteratively refining the HDR to LDR tone-mapping operator, to best approximate the camera tone reproduction curve. At each iteration, the HDR to LDR tone-mapping operator converts the HDR images into the tone-mapped LDR images according to a current value of the at least one trainable parameter at said iteration. The current value of the at least one trainable parameter impacts how a wide dynamic range of the HDR images is compressed into LDR at said iteration, for producing the tone-mapped LDR images. Beneficially, the tone-mapped LDR images can be accurately compared with the ground truth LDR images, to determine the second loss function, as both these types of images have narrow dynamic ranges.

Optionally, weights in the second loss function lie in a range of 0-1. For example, the weights may be from 0.05, 0.1, 0.15, 0.2, 0.3, 0.5, or 0.7, up to 0.25, 0.4, 0.55, 0.75, 0.85, 0.9, 0.95, or 1. It will be appreciated that intermediate values of the weights are also feasible. It will be appreciated that the second loss function at each iteration is indicative of a quality of the tone-mapped LDR images produced at said iteration by the HDR to LDR tone-mapping operator. By comparing the tone-mapped images to the ground truth LDR images, any deviations or errors in the tone-mapping process can be identified and quantified. This information is essential for assessing a performance of the HDR to LDR tone-mapping operator and guiding optimization efforts in subsequent iteration(s) to improve the accuracy and fidelity of the tone-mapped results. For example, higher the second loss function, lower the performance of the HDR to LDR tone-mapping operator. Additionally, use of weighted pixel value differences enables for prioritizing or de-prioritizing certain regions or features of the images in such loss computation by assigning higher weights or lower weights, respectively, enabling finer control over the optimization of the tone-mapping operator.

Next, at each iteration, the second loss function at said iteration is used to adjust the current value of the at least one trainable parameter of the HDR to LDR tone-mapping operator. Optionally, gradients (such as derivates) of the second loss function with respect to the at least one trainable parameter is computed and back-propagated through the HDR to LDR tone-mapping operator, to update the at least one trainable parameter in the way that reduced the second loss function. It will be appreciated that upon the iterative refinement of the HDR to LDR tone-mapping operator by adjusting the value of the at least one trainable parameter over the at least one iteration, the second loss function is minimized, which indicates that the HDR to LDR tone-mapping operator best approximates the camera TRC. In other words, the HDR to LDR tone-mapping operator learns to perform HDR to LDR tone-mapping in a manner that is similar to how the camera TRC transforms HDR information of the 3D scene when capturing the ground truth LDR images. Upon performing the at least one iteration, the HDR to LDR tone-mapping operator is finely tuned (i.e., optimized) to accurately map the HDR images to their corresponding tone-mapped LDR representations in a way that accurately reproduces tones and colours of the ground truth LDR images. The HDR to LDR tone-mapping operator that achieves the best approximation of the camera TRC is selected for use in the steps (iii) and/or (vi) of the method, for ensuring that HDR to LDR tone-mapping is performed accurately.

Optionally, a loss value of the first loss function is backpropagated to the camera TRC. Such backpropagation may additionally be implemented at the step (vii) of the method or as a separate step. Notably, the first loss function takes into account the input image and the tone-mapped LDR image, out of which the tone-mapped LDR image is an output of applying the HDR to LDR tone-mapping operator on the (rendered) HDR image. Thus, the tone-mapped LDR image indirectly depends on the value of the at least one trainable parameter of the HDR to LDR tone-mapping operator. Backpropagating the loss value of the first loss function to the camera TRC enables in computing a partial derivative of the loss value with respect to the value of the at least one trainable parameter. This allows for further adjustment in the value of the at least one trainable parameter, such that the HDR to LDR tone-mapping operator best approximates the camera TRC, for enabling generation of accurately tone-mapped LDR images.

In an embodiment, the method further comprising:
determining an exposure level of the input image by analysing metadata corresponding to the input image; and
determining an exposure gain factor that corresponds to an exposure value difference between the exposure level of the input image and an absolute exposure level of the HDR 3D reconstruction model, wherein when performing the step (iii) of applying the HDR to LDR tone-mapping operator on the HDR image, pixel values of the pixels of the HDR image are scaled according to the exposure gain factor.

In this regard, the term "exposure level" refers to an amount of light per unit area reaching the image sensor of the camera during capturing of an image by the camera. The exposure level influences at least a brightness of the captured image, with higher exposure levels resulting in brighter images and lower exposure levels producing darker images. Optionally, the exposure level is expressed in terms of an exposure value (EV).

Optionally, the metadata corresponding to the input image comprises exchangeable image file format (EXIF) data. The EXIF data may be embedded within the input image. The EXIF data of any input image includes information about one or more of camera settings (for example such as aperture size, shutter speed, ISO sensitivity, focal length, lens type, and the like), imaging conditions (for example, such as camera pose, lighting conditions, and the like), image parameters (for example, such as image resolution, colour space, and the like), image processing software, and the like, at a time when input image was captured.

Notably, the metadata corresponding to the input image is analysed using well-known techniques, to accurately determine the exposure level of the input image. This might involve converting the aperture size, the shutter speed, and the ISO settings into a standardized EV, or similar. For example, the metadata embedded within the input image file may indicates that an aperture size was set to f/2.8, the shutter speed was set to 1/30 seconds, and the ISO sensitivity was set to 100, when capturing the input image. By analysing this metadata, the exposure level of the input image is determined to be equal to 5 EV.

Herein, the term "absolute exposure level" refers to a reference exposure value which is used as a baseline for training the HDR 3D reconstruction model. The absolute exposure level is a target exposure level that HDR processing performed by the HDR 3D reconstruction model aims to achieve in the HDR images it generates. Herein, the "exposure gain factor" is a value which quantifies the scale of discrepancy between exposure levels of the input image and the HDR 3D reconstruction model. Referring to the above example, if the absolute exposure level is 7 EV, the exposure gain factor is equal to 2 EV (which is 7 EV-5 EV (calculated in the above example). Optionally, the pixel values of the pixels of the HDR image are multiplied by a factor of 2 raised to the power of the exposure gain factor. This is so because a relationship between exposure values and pixel values is logarithmic, meaning that an increase of 1 EV corresponds to doubling an amount of light, which means that each EV step is a factor of 2 in terms of light intensity (or pixel value). Continuing the above example, the pixel values of the pixels of the HDR image may be multiplied by 4 (which is equal to 2 raised to the power of 2 (i.e., the exposure gain factor). Beneficially, the exposure gain factor is used to scale the pixel values of the HDR image during the tone-mapping process, ensuring that the resulting tone-mapped LDR image matches the exposure level of the input image and can easily be compared with the input image for correctly determining the first loss function.

In another embodiment, an exposure gain factor is a trainable parameter of the HDR 3D reconstruction model, and wherein the method further comprises iteratively adjusting a value of the exposure gain factor while training the HDR 3D reconstruction model, wherein when performing the step (iii) of applying the HDR to LDR tone-mapping operator on the HDR image, pixel values of the pixels of the HDR image are scaled by the exposure gain factor.

In this regard, the exposure gain factor is the trainable parameter which then gets adjusted by back-propagation of the gradient of the first loss function, over at least one iteration of the method, and eventually converges on a value that results in a coherent reconstruction (assuming sufficient training input images for the HDR 3D reconstruction model). This approach enables more flexibility and adaptability in exposure normalization, as the exposure level of the HDR image can be adjusted dynamically based on a current exposure level of HDR 3D reconstruction and the exposure level of the input image. It will be appreciated that making the exposure gain factor the trainable parameter, enables the HDR 3D reconstruction model to dynamically adapt to various exposure levels present in different input images. This results in an optimized HDR to LDR tone-mapping process, which improves the overall quality and the accuracy of the tone-mapped LDR image (generated using the HDR image) by ensuring that the pixel values of the HDR image are appropriately scaled during tone-mapping.

Upon such exposure scaling, exposure levels of the tone-mapped LDR image and the input image match, so that the loss function is accurately determined based on a comparison of these images.

Training of the HDR 3D Reconstruction Model

Described below are three exemplary embodiments describing a step of training of the HDR 3D reconstruction model. A person skilled in the art would appreciate that said training can also be performed using other feasible embodiments. Notably, the step of training the HDR 3D reconstruction model for HDR image reconstruction of the 3D environment is performed prior to performing the steps (i)-(vii) of the method.

In an embodiment, the method further comprises training the HDR 3D reconstruction model for HDR image reconstruction of the 3D environment, by implementing a first training process, wherein the first training process comprises:

receiving a plurality of input images representing the 3D environment from a plurality of viewpoints and view directions, wherein the plurality of input images are LDR images that are captured by at least one camera at a plurality of exposure levels;

analysing metadata corresponding to the plurality of input images for determining the plurality of exposure levels of the plurality of input images;

mapping the plurality of exposure levels to an HDR colour space, for generating a plurality of HDR images corresponding to the plurality of input images; and training a neural network using the plurality of HDR images, for generating a HDR 3D model of the 3D environment.

Optionally, the plurality of input images are received from the at least one camera, or a data repository at which the plurality of images captured by the at least one camera are stored, or similar. The plurality of input images represent the 3D environment from a plurality of viewpoints and view directions, so that all regions of the 3D environment are captured in at least one input image. The plurality of viewpoints and view directions are positions and orientations of the at least one camera (i.e., poses of the at least one camera) at a time of capturing the plurality of input images. The plurality of input images being the LDR images means that each input image amongst the plurality of input images has a limited range (i.e., a narrow range) of brightness and colour depth. Therefore, the plurality of images are captured at the plurality of exposure levels, so that visual details of light regions as well as dark regions in the 3D environment are accurately captured in at least one input image.

Optionally, the metadata corresponding to the plurality of input images is embedded in the plurality of images, and is indicative of the plurality of exposure levels at which the plurality of input images are captured. Such metadata is already described earlier, with respect to a single input image.

It will be appreciated that the HDR colour space is wider than individual LDR colour spaces of the plurality of input images. Therefore, the plurality of exposure levels at which the plurality of input (LDR) images are captured, are optionally mapped to different portions of the HDR colour space. Upon such mapping, the plurality of HDR images are generated using the plurality of input (LDR) images, using well-known techniques in the art. A number of the plurality of HDR images would be lesser than a number of the plurality of input images. This is so because one HDR image is generated based on multiple corresponding input (LDR)

images having various exposure levels (i.e., mapped to various portions of the HDR colour space).

Optionally, when the first training process is implemented, the HDR 3D reconstruction model is the neural network. The neural network is trained, by providing the plurality of HDR images as training data, for learning the generation of the HDR 3D model of the 3D environment based on the plurality of HDR images. As an example, the neural network may be trained by feeding the plurality of HDR images into the neural network and applying techniques such as Structure-from-Motion (SfM), Multi-View Stereo (MVS), and the like, for generating the 3D HDR model based on the plurality of HDR images. Post-training, the one or more model parameters of the neural network (i.e., the HDR 3D reconstruction model) may be iteratively optimized, using optimization techniques (for example, such as gradient descent, neural network-based optimization, and the like) to minimize a photometric error between test input LDR images (provided to the neural network) and rendered test HDR images (by the neural network).

In another embodiment, the method further comprises training the HDR 3D reconstruction model for HDR image reconstruction of the 3D environment, by implementing a second training process, wherein the second training process comprises:

receiving a plurality of input images representing the 3D environment from a plurality of viewpoints and view directions, wherein the plurality of input images are LDR images that are captured by at least one camera at a plurality of exposure levels; and using a Structure-from-Motion (SfM) technique for creating one of: a HDR 3D point cloud, a HDR 3D voxel grid, of the 3D environment, from the plurality of input images.

In this regard, the step of receiving the plurality of input images, and a nature of the plurality of input images is same as that described earlier, with respect to the first training process. When the second training process is implemented, the HDR 3D reconstruction model is the one of: the HDR 3D point cloud, the HDR 3D voxel grid, of the 3D environment.

Optionally, the SfM technique processes the plurality of input images, along with their plurality of viewpoints and view directions, for creating the one of: the HDR 3D point cloud, the HDR 3D voxel grid, of the 3D environment. In this way, the SfM technique reconstructs a 3D geometry and visual detail of the 3D environment, in the HDR 3D reconstruction model. Furthermore, the SfM technique leverages information of plurality of exposure levels employed for capturing the plurality of input images, to extract a wide range of luminance values (representing high dynamic range information about the 3D environment) that are present in the HDR 3D reconstruction model.

In one instance when the HDR 3D point cloud is created, each point in the HDR 3D point cloud represents a 3D coordinate in the 3D environment and is derived by matching features across multiple input images. Moreover, each point in the HDR 3D point cloud is associated with high dynamic range information. In another instance when the HDR 3D voxel grid is created, each voxel in the HDR 3D voxel grid represents a 3D region in the 3D environment and is derived by dividing the 3D environment into a voxel grid having a dimension and a resolution (which depend on a level the 3D geometry and visual detail of the 3D environment reconstructed by the SfM technique). Each voxel includes multiple 3D points in the 3D region within its volume, and includes HDR information about the 3D region.

Optionally, the second training process further comprises:

analysing metadata corresponding to the plurality of input
images for determining the plurality of exposure levels
of the plurality of input images;

determining an average exposure gain across the plurality
of input images, using the plurality of exposure levels;
and scaling pixel values of all points in the one of: the HDR
3D point cloud, the HDR 3D voxel grid, by the average
exposure gain.

In this regard, the metadata corresponding to the plurality
of input images is analysed in a same manner as that
described earlier, with respect to the first training process.
The average exposure gain is determined as an average of
the plurality of exposure levels. Scaling the pixel values of
all points (i.e., all 3D points) in the one of: the HDR 3D
point cloud, the HDR 3D voxel grid, by the average expo-
sure gain, beneficially enables normalization of exposure
levels across the one of: the HDR 3D point cloud, the HDR
3D voxel grid. Resultantly, HDR images rendered by the one
of: the HDR 3D point cloud, the HDR 3D voxel grid, have
minimal or nil over-exposure and under-exposure issues.

Optionally, the second training process further comprises
employing a Gaussian Splatting technique for representing
each point in the one of: the HDR 3D point cloud, the HDR
3D voxel grid, as a gaussian blob. The gaussian blob is a
smooth, continuous function whose influence is over a small
defined area. When each point is represented as the gaussian
blob by employing the Gaussian Splatting technique, each
point is represented in a way that blends smoothly with its
neighbours. This enables in avoiding sharp edges, reducing
aliasing effects, and providing a better approximation of
surfaces and volumes in the 3D environment (which is
especially beneficial for HDR image rendering purposes).

In yet another embodiment, the method further compris-
ing training the HDR 3D reconstruction model for HDR
image reconstruction of the 3D environment, by implement-
ing a third training process, wherein the third training
process comprises:

receiving a plurality of input images representing the 3D
environment from a plurality of viewpoints and view
directions, wherein the plurality of input images are
LDR images that are captured by at least one camera at
a plurality of exposure levels;

analysing metadata corresponding to the plurality of input
images for determining the plurality of exposure levels
of the plurality of input images;

determining an exposure gain of each input image
amongst the plurality of input images, relative to a
reference exposure level;

using a Structure-from-Motion (SfM) technique for cre-
ating one of: a HDR 3D point cloud, a HDR 3D voxel
grid, of the 3D environment, from the plurality of input
images;

finding a plurality of image points corresponding to the
one of: the HDR 3D point cloud, the HDR 3D voxel
grid;

for each image point amongst the plurality of image
points, scaling pixel values of said image point by the
exposure gain of its corresponding input image; and for each point in the HDR 3D point cloud or for each
voxel in the HDR 3D voxel grid, using an average of
the scaled pixel values of one or more image points
corresponding to said point or said voxel, as a pixel
value of said point or said voxel.

In this regard, the steps of receiving the plurality of input
images, analysing the metadata corresponding to the plural-
ity of input images, and using the SfM technique are same as that described earlier, with respect to the first training
process. Moreover, a nature of the plurality of input images
is also same as that described earlier, with respect to the first
training process. When the third training process is imple-
mented, the HDR 3D reconstruction model is the one of: the
HDR 3D point cloud, the HDR 3D voxel grid, of the 3D
environment.

Optionally, the reference exposure level is an exposure
level at which the HDR 3D reconstruction model is required
to render HDR images upon training. The exposure gain of
any input image is a factor by which pixel values of pixels
in the input image need to be scaled, for normalizing
exposure levels across the plurality of input images relative
to the reference exposure level.

The term "image point" refers to a 2D point in an input
image, in some embodiments of the present disclosure.
When the input image is associated with a depth map, the
image point could also refer to a 3D point. The plurality of
image points are found (i.e., mapped) corresponding to the
HDR 3D reconstruction model, so that pixel values of the
plurality of image points can be unprojected into the HDR
3D reconstruction model. The aforementioned step of find-
ing the plurality of image points corresponding to the HDR
3D reconstruction model (i.e., the one of: the HDR 3D point
cloud, the HDR 3D voxel grid) is implemented by process-
ing output information generated in the step of using the
SfM technique. In particular, the output information is used
to determine which input image(s) and which pixels in said
input image(s) map to each 3D point in the HDR 3D
reconstruction model. The pixel value of each image point is
scaled by the exposure gain of its corresponding input
image, to produce HDR colours for a corresponding 3D
point in the HDR 3D reconstruction model. Such scaling is
implemented on a per-image basis as different input images
can have different exposure gains, and one 3D point in the
HDR 3D reconstruction model can have pixels from mul-
tiple input images mapped thereto. In other words, such
scaling adjusts the pixel values of image points to account
for differences in exposure levels across the plurality of
input images, so that exposures of unprojected image points
are normalized. The scaled pixel values of one or more
image points corresponding to each point (in the HDR 3D
point cloud) or each voxel (in the HDR 3D voxel grid) are
averaged to accurately set the pixel value (which is a HDR
colour value) of said point or for said voxel.

Optionally, prior to the step of scaling the pixel values of
each image point, the third training process further com-
prises linearizing pixel values of pixels in the plurality of
input images, using an approximative tone-mapping opera-
tor.

The "depth map" is a data structure that is indicative of
optical depths of each point in its associated image, from a
camera that was used to capture said image. When the input
image is optionally associated with the depth map, the step
of finding the plurality of image points corresponding to the
one of: the HDR 3D point cloud, the HDR 3D voxel grid,
may be slightly different from how it is described above. In
such a case, camera extrinsic and the output information can
be used to directly unproject arbitrary image points into a
relatively denser HDR 3D point cloud or a relatively denser
HDR 3D voxel grid.

The present disclosure also relates to the second aspect as
described above. Various embodiments and variants dis-
closed above, with respect to the aforementioned first aspect,
apply mutatis mutandis to the second aspect.

Optionally, the at least one processor is further configured to iteratively perform the steps (ii)-(vii) until the first loss function is minimized.

In an embodiment, when de-weighting the at least one pixel value difference at the step (vi), the at least one processor is configured to:

determine a derivative of the HDR to LDR tone-mapping operator, for each pixel of the input image; and adjust a weight of the at least one pixel value difference such that the weight is proportional to the derivative of the HDR to LDR tone-mapping operator, the weight lying within a first threshold from zero.

In another embodiment, when de-weighting the at least one pixel value difference at the step (vi), the at least one processor is configured to adjust a weight of the at least one pixel value difference according to a value of at least one of: a first ramp function, a second ramp function, for the at least one saturated pixel, wherein the first ramp function ranges between 0 to 1 such that the value of the first ramp function is equal to 0 when a pixel value of a saturated pixel is equal to a maximum LDR pixel value, and the value of the first ramp function is equal to 1 when the pixel value of the saturated pixel is equal to a first threshold LDR pixel value corresponding to the maximum LDR pixel value, and the second ramp function ranges between 0 to 1 such that the value of the second ramp function is equal to 0 when a pixel value of a saturated pixel is equal to a minimum LDR pixel value, and the value of the second ramp function is equal to 1 when the pixel value of the saturated pixel is equal to a second threshold LDR pixel value corresponding to the minimum LDR pixel value.

In yet another embodiment, wherein when de-weighting the at least one pixel value difference at the step (vi), the at least one processor is configured to:

adjust a weight of a pixel value difference to zero, when a pixel value of a corresponding saturated pixel is equal to a maximum LDR pixel value or to a minimum LDR pixel value; and adjust a weight of a pixel value difference to one, when a pixel value of a corresponding saturated pixel is equal to any other pixel value.

In still another embodiment, wherein when de-weighting the at least one pixel value difference at the step (vi), the at least one processor is configured to:

adjust a weight of a pixel value difference corresponding to a pixel of the tone-mapped LDR image whose pixel value is greater than a first threshold LDR pixel value corresponding to a maximum LDR pixel value, to zero; and adjust a weight of a pixel value difference corresponding to a pixel of the tone-mapped LDR image whose pixel value is lesser than a second threshold LDR pixel value corresponding to a minimum LDR pixel value, to zero, wherein the first threshold LDR pixel value and the second threshold LDR pixel value are defined by values of one or more parameters of the HDR to LDR tone-mapping operator.

Optionally, the at least one processor is further configured to estimate a camera tone reproduction curve, wherein when estimating the camera tone reproduction curve, the at least one processor is configured to:

initialize a value of at least one trainable parameter of the HDR to LDR tone-mapping operator to a default value;

generate a training dataset comprising ground truth LDR images captured by the camera and HDR images corresponding to the ground truth LDR images; and perform at least one iteration, wherein at each iteration, the at least one processor is configured to:

apply the HDR to LDR tone-mapping operator on the HDR images, to produce tone-mapped LDR images;

determine a second loss function between the ground truth LDR images and the tone-mapped LDR images, the second loss function comprising weighted pixel value differences between pixels of the ground truth LDR images and their corresponding pixels of the tone-mapped LDR image; and back-propagate the second loss function through the HDR to LDR tone-mapping operator to adjust the value of the at least one trainable parameter in a way that reduces the second loss function, wherein when the second loss function is minimized upon performing the at least one iteration, the HDR to LDR tone-mapping operator best approximates the camera tone reproduction curve, and wherein the HDR to LDR tone-mapping operator that best approximates the camera tone reproduction curve is used when performing step (iii) and/or step (vi).

In an embodiment, the at least one processor is further configured to:

determine an exposure level of the input image by analysing metadata corresponding to the input image; and determine an exposure gain factor that corresponds to an exposure value difference between the exposure level of the input image and an absolute exposure level of the HDR 3D reconstruction model, wherein when applying the HDR to LDR tone-mapping operator on the HDR image at the step (iii), the at least one processor is configured to scale pixel values of the pixels of the HDR image by the exposure gain factor.

In another embodiment, an exposure gain factor is a trainable parameter of the HDR 3D reconstruction model, and wherein the at least one processor is further configured to iteratively adjust a value of the exposure gain factor while training the HDR 3D reconstruction model, wherein when applying the HDR to LDR tone-mapping operator on the HDR image at the step (iii), the at least one processor is configured to scale pixel values of the pixels of the HDR image by the exposure gain factor.

Optionally, the at least one processor is further configured to train the HDR 3D reconstruction model for HDR image reconstruction of the 3D environment, by implementing a first training process, wherein when implementing the first training process, the at least one processor is configured to:

receive a plurality of input images representing the 3D environment from a plurality of viewpoints and view directions, wherein the plurality of input images are LDR images that are captured by at least one camera at a plurality of exposure levels;

analyse metadata corresponding to the plurality of input images to determine the plurality of exposure levels of the plurality of input images;

map the plurality of exposure levels to an HDR colour space, to generate a plurality of HDR images corresponding to the plurality of input images; and train a neural network using the plurality of HDR images, to generate a HDR 3D model of the 3D environment.

Alternatively, optionally, the at least one processor is further configured to train the HDR 3D reconstruction model for HDR image reconstruction of the 3D environment, by implementing a second training process, wherein when implementing the second training process, the at least one processor is configured to:

receive a plurality of input images representing the 3D environment from a plurality of viewpoints and view directions, wherein the plurality of input images are LDR images that are captured by at least one camera at a plurality of exposure levels; and use a Structure-from-Motion (SfM) technique to create one of: a HDR 3D point cloud, a HDR 3D voxel grid, of the 3D environment, from the plurality of input images.

Yet alternatively, optionally, the at least one processor is further configured to train the HDR 3D reconstruction model for HDR image reconstruction of the 3D environment, by implementing a third training process, wherein when implementing the third training process, the at least one processor is configured to:

receive a plurality of input images representing the 3D environment from a plurality of viewpoints and view directions, wherein the plurality of input images are LDR images that are captured by at least one camera at a plurality of exposure levels;

analyse metadata corresponding to the plurality of input images to determine the plurality of exposure levels of the plurality of input images;

determine an exposure gain of each input image amongst the plurality of input images, relative to a reference exposure level;

use a Structure-from-Motion (SfM) technique to create one of: a HDR 3D point cloud, a HDR 3D voxel grid, of the 3D environment, from the plurality of input images;

find a plurality of image points corresponding to the one of: the HDR 3D point cloud, the HDR 3D voxel grid;

for each image point amongst the plurality of image points, scale pixel values of said image point by the exposure gain of its corresponding input image; and for each point in the HDR 3D point cloud or for each voxel in the HDR 3D voxel grid, use an average of the scaled pixel values of one or more image points corresponding to said point or said voxel, as a pixel value of said point or said voxel.

Optionally, in the system, the HDR 3D reconstruction model is one of: a neural network, a voxel grid, a point cloud.

DETAILED DESCRIPTION OF THE DRAWINGS

Referring to FIG. 1, illustrated is a process flow of a method for enabling exposure-guided three-dimensional (3D) reconstruction, in accordance with an embodiment of the present disclosure. At step 102, an input image captured by a camera is received, wherein the input image is a Low Dynamic Range (LDR) image. At step 104, a High Dynamic Range (HDR) image corresponding to the input image is rendered, using a HDR 3D reconstruction model 106 that is pre-trained for HDR image reconstruction of a 3D environment. At step 108, a HDR to LDR tone-mapping operator on the HDR image is applied, for producing a tone-mapped LDR image. At step 110, a first loss function between the input image and the tone-mapped LDR image is determined, wherein the first loss function comprises weighted pixel value differences between pixels of the input image and their corresponding pixels of the tone-mapped LDR image. At step 112, it is determined whether the input image has at least one saturated pixel, wherein the at least one saturated pixel comprises at least one of: a highlight saturated pixel, a shadow saturated pixel. When it is determined that the input image has the at least one saturated pixel in the first loss function, then at step 114 at least one pixel value difference corresponding to the at least one saturated pixel is de-weighted. At step 116, a gradient of the first loss function with respect to one or more model parameters is back-propagated through a differentiable render function of the HDR 3D reconstruction model 106, for adjusting the one or more model parameters in a way that reduces the first loss function, wherein the differentiable render function comprises an HDR image-rendering function and the HDR to LDR tone-mapping operator.

Herein, the input image may be selected from amongst a plurality of input images 118 captured by the camera. The plurality of input images 118 may be stored at a memory of the camera, or at a data repository communicably coupled to the camera, or similar. Optionally, the method for enabling the exposure-guided 3D reconstruction further comprises estimating a camera tone reproduction curve 120, wherein the HDR to LDR tone-mapping operator that best approximates the camera tone reproduction curve is used at step 108 and/or step 114. Additionally, at the step 116, a loss value of the first loss function may also be backpropagated to the camera tone reproduction curve 120 (this is depicted by the arrow between the step 116 and the camera tone reproduction curve 120).

It may be understood by a person skilled in the art that the FIG. 1 includes a simplified process flow of the method for enabling exposure-guided 3D reconstruction for sake of clarity, which should not unduly limit the scope of the claims herein. The person skilled in the art will recognize many variations, alternatives, and modifications of embodiments of the present disclosure.

Figure 2:
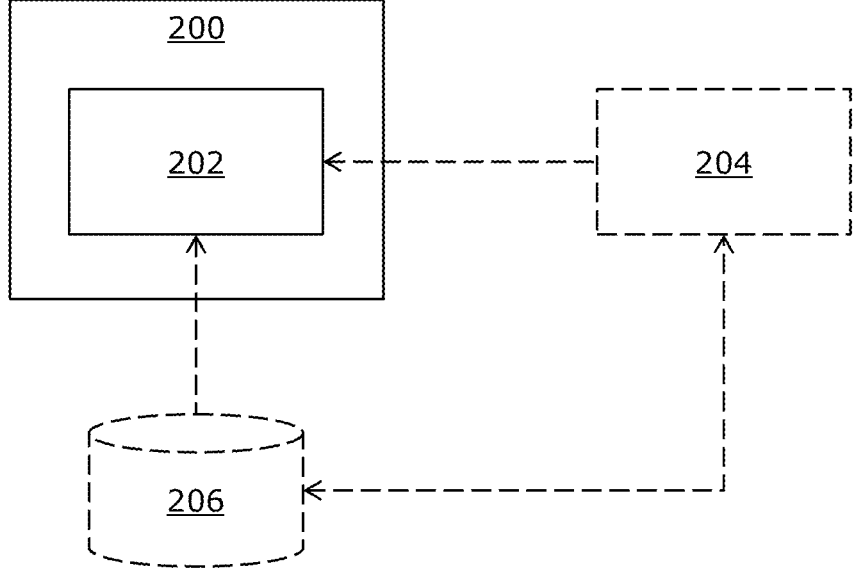
FIG. 2 illustrates a block diagram of an architecture of a system for enabling exposure-guided three-dimensional (3D) reconstruction, in accordance with an embodiment of the present disclosure.

Referring to FIG. 2, illustrated is a block diagram of an architecture of a system 200 for enabling exposure-guided three-dimensional (3D) reconstruction, in accordance with an embodiment of the present disclosure. The system 200 comprises at least one processor (depicted as a processor 202). In one embodiment, the processor 202 is coupled to a camera 204, wherein the processor 202 receives an input image captured by the camera 204. In another embodiment, the processor 202 is coupled to a data repository 206 to which the camera 204 is communicably coupled, wherein the processor 202 receives an input image, captured by the camera 204, from the data repository 206.

It may be understood by a person skilled in the art that the FIG. 2 includes a simplified block diagram of an architecture of the system 200 for enabling exposure-guided 3D reconstruction for sake of clarity, which should not unduly limit the scope of the claims herein. The person skilled in the art will recognize many variations, alternatives, and modifications of embodiments of the present disclosure.

The invention claimed is:

1. A method for enabling exposure-guided three-dimensional (3D) reconstruction, the method comprising:

(i) receiving an input image captured by a camera, wherein the input image is a Low Dynamic Range (LDR) image;

(ii) rendering a High Dynamic Range (HDR) image corresponding to the input image, using a HDR 3D reconstruction model that is pre-trained for HDR image reconstruction of a 3D environment;

(iii) applying a HDR to LDR tone-mapping operator on the HDR image, for producing a tone-mapped LDR image;

(iv) determining a first loss function between the input image and the tone-mapped LDR image, the first loss function comprising weighted pixel value differences between pixels of the input image and their corresponding pixels of the tone-mapped LDR image;

(v) determining whether the input image has at least one saturated pixel, wherein the at least one saturated pixel comprises at least one of: a highlight saturated pixel, a shadow saturated pixel;

(vi) de-weighting at least one pixel value difference corresponding to the at least one saturated pixel, in the first loss function, when it is determined that the input image has the at least one saturated pixel; and (vii) back-propagating a gradient of the first loss function with respect to one or more model parameters, through a differentiable render function of the HDR 3D reconstruction model, for adjusting the one or more model parameters in a way that reduces the first loss function, wherein the differentiable render function comprises an HDR image-rendering function and the HDR to LDR tone-mapping operator.

2. The method of claim 1, wherein the steps (ii)-(vii) are performed iteratively until the first loss function is minimized.

3. The method of claim 1, wherein the step (vi) of de-weighting the at least one pixel value difference comprises:

determining a derivative of the HDR to LDR tone-mapping operator, for each pixel of the input image; and adjusting a weight of the at least one pixel value difference such that the weight is proportional to the derivative of the HDR to LDR tone-mapping operator, the weight lying within a first threshold from zero.

4. The method of claim 1, wherein the step (vi) of de-weighting the at least one pixel value difference comprises adjusting a weight of the at least one pixel value difference according to a value of at least one of: a first ramp function, a second ramp function, for the at least one saturated pixel, wherein the first ramp function ranges between 0 to 1 such that the value of the first ramp function is equal to 0 when a pixel value of a saturated pixel is equal to a maximum LDR pixel value, and the value of the first ramp function is equal to 1 when the pixel value of the saturated pixel is equal to a first threshold LDR pixel value corresponding to the maximum LDR pixel value, and the second ramp function ranges between 0 to 1 such that the value of the second ramp function is equal to 0 when a pixel value of a saturated pixel is equal to a minimum LDR pixel value, and the value of the second ramp function is equal to 1 when the pixel value of the saturated pixel is equal to a second threshold LDR pixel value corresponding to the minimum LDR pixel value.

5. The method of claim 1, wherein the step (vi) of de-weighting the at least one pixel value difference comprises:

adjusting a weight of a pixel value difference to zero, when a pixel value of a corresponding saturated pixel is equal to a maximum LDR pixel value or to a minimum LDR pixel value; and adjusting a weight of a pixel value difference to one, when a pixel value of a corresponding saturated pixel is equal to any other pixel value.

6. The method of claim 1, wherein the step (vi) of de-weighting the at least one pixel value difference comprises:

adjusting a weight of a pixel value difference corresponding to a pixel of the tone-mapped LDR image whose pixel value is greater than a first threshold LDR pixel value corresponding to a maximum LDR pixel value, to zero; and adjusting a weight of a pixel value difference corresponding to a pixel of the tone-mapped LDR image whose pixel value is lesser than a second threshold LDR pixel value corresponding to a minimum LDR pixel value, to zero, wherein the first threshold LDR pixel value and the second threshold LDR pixel value are defined by values of one or more parameters of the HDR to LDR tone-mapping operator.

7. The method of claim 1, further comprising estimating a camera tone reproduction curve by:

initializing a value of at least one trainable parameter of the HDR to LDR tone-mapping operator to a default value;

generating a training dataset comprising ground truth LDR images captured by the camera and HDR images corresponding to the ground truth LDR images; and performing at least one iteration of:

applying the HDR to LDR tone-mapping operator on the HDR images, for producing tone-mapped LDR images;

determining a second loss function between the ground truth LDR images and the tone-mapped LDR images, the second loss function comprising weighted pixel value differences between pixels of the ground truth LDR images and their corresponding pixels of the tone-mapped LDR image; and back-propagating the second loss function through the HDR to LDR tone-mapping operator for adjusting the value of the at least one trainable parameter in a way that reduces the second loss function, wherein when the second loss function is minimized upon performing the at least one iteration, the HDR to LDR tone-mapping operator best approximates the camera tone reproduction curve, and wherein the HDR to LDR tone-mapping operator that best approximates the camera tone reproduction curve is used at step (iii) and/or step (vi).

8. The method of claim 1, further comprising:

determining an exposure level of the input image by analysing metadata corresponding to the input image; and determining an exposure gain factor that corresponds to an exposure value difference between the exposure level of the input image and an absolute exposure level of the HDR 3D reconstruction model, wherein when performing the step (iii) of applying the HDR to LDR tone-mapping operator on the HDR image, pixel values of the pixels of the HDR image are scaled according to the exposure gain factor.

9. The method of claim 1, wherein an exposure gain factor is a trainable parameter of the HDR 3D reconstruction model, and wherein the method further comprises iteratively adjusting a value of the exposure gain factor while training the HDR 3D reconstruction model, wherein when performing the step (iii) of applying the HDR to LDR tone-mapping operator on the HDR image, pixel values of the pixels of the HDR image are scaled by the exposure gain factor.

10. The method of claim 1, further comprising training the HDR 3D reconstruction model for HDR image reconstruction of the 3D environment, by implementing a first training process, wherein the first training process comprises:

receiving a plurality of input images (118) representing the 3D environment from a plurality of viewpoints and view directions, wherein the plurality of input images are LDR images that are captured by at least one camera at a plurality of exposure levels;

analysing metadata corresponding to the plurality of input images for determining the plurality of exposure levels of the plurality of input images;

mapping the plurality of exposure levels to an HDR colour space, for generating a plurality of HDR images corresponding to the plurality of input images; and training a neural network using the plurality of HDR images, for generating a HDR 3D model of the 3D environment.

11. The method of claim 1, further comprising training the HDR 3D reconstruction model for HDR image reconstruction of the 3D environment, by implementing a second training process, wherein the second training process comprises:

receiving a plurality of input images representing the 3D environment from a plurality of viewpoints and view directions, wherein the plurality of input images are LDR images that are captured by at least one camera at a plurality of exposure levels; and using a Structure-from-Motion (SfM) technique for creating one of: a HDR 3D point cloud, a HDR 3D voxel grid, of the 3D environment, from the plurality of input images.

12. The method of claim 1, further comprising training the HDR 3D reconstruction model for HDR image reconstruction of the 3D environment, by implementing a third training process, wherein the third training process comprises:

receiving a plurality of input images representing the 3D environment from a plurality of viewpoints and view directions, wherein the plurality of input images are LDR images that are captured by at least one camera at a plurality of exposure levels;

analysing metadata corresponding to the plurality of input images for determining the plurality of exposure levels of the plurality of input images;

determining an exposure gain of each input image amongst the plurality of input images, relative to a reference exposure level;

using a Structure-from-Motion (SfM) technique for creating one of: a HDR 3D point cloud, a HDR 3D voxel grid, of the 3D environment, from the plurality of input images;

finding a plurality of image points corresponding to the one of: the HDR 3D point cloud, the HDR 3D voxel grid;

for each image point amongst the plurality of image points, scaling pixel values of said image point by the exposure gain of its corresponding input image; and for each point in the HDR 3D point cloud or for each voxel in the HDR 3D voxel grid, using an average of the scaled pixel values of one or more image points corresponding to said point or said voxel, as a pixel value of said point or said voxel.

13. The method of claim 1, wherein the HDR 3D reconstruction model is one of: a neural network, a voxel grid, a point cloud.

14. A system for enabling exposure-guided three-dimensional (3D) reconstruction, the system comprising at least one processor configured to:

(i) receive an input image captured by a camera, wherein the input image is a Low Dynamic Range (LDR) image, and wherein the at least one processor is communicably coupled to the camera or to a data repository that is communicably coupled to the camera;

(ii) render a High Dynamic Range (HDR) image corresponding to the input image, using a HDR 3D reconstruction model that is pre-trained for HDR image reconstruction of a 3D environment;

(iii) apply a HDR to LDR tone-mapping operator on the HDR image, to produce a tone-mapped LDR image;

(iv) determine a first loss function between the input image and the tone-mapped LDR image, the first loss function comprising weighted pixel value differences between pixels of the input image and their corresponding pixels of the tone-mapped LDR image;

(v) determine whether the input image has at least one saturated pixel, wherein the at least one saturated pixel comprises at least one of: a highlight saturated pixel, a shadow saturated pixel;

(vi) de-weight at least one pixel value difference corresponding to the at least one saturated pixel, in the first loss function, when it is determined that the input image has the at least one saturated pixel; and (vii) back-propagate a gradient of the first loss function with respect to one or more model parameters, through a differentiable render function of the HDR 3D reconstruction model, for adjusting the one or more model parameters in a way that reduces the first loss function, wherein the differentiable render function comprises an HDR image-rendering function and the HDR to LDR tone-mapping operator.

15. The system of claim 14, wherein the at least one processor is further configured to iteratively perform the steps (ii)-(vii) until the first loss function is minimized.

* * * * *